Figures 1, 2:
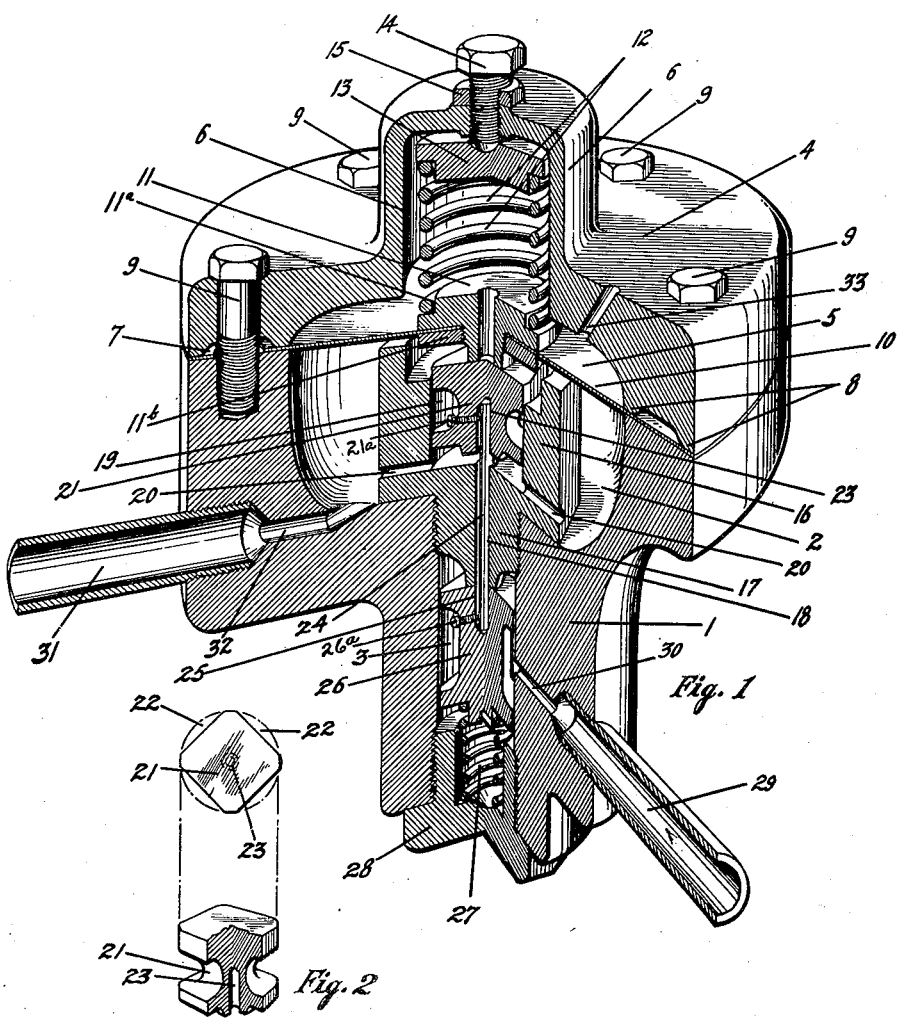

Sept. 6, 1927.

W. FOURNESS 1,641,628

AUTOMATIC VALVE CONTROL

Filed Oct. 8, 1925

INVENTOR.
Wilfred Fourness
BY
ATTORNEY

Patented Sept. 6, 1927.

1,641,628

UNITED STATES PATENT OFFICE.

WILFRED FOURNESS, OF PASADENA, CALIFORNIA, ASSIGNOR TO E. G. BURGHARD, OF GLENDALE, CALIFORNIA.

AUTOMATIC-VALVE CONTROL.

Application filed October 8, 1925. Serial No. 61,373.

The main object of my invention is to provide an automatic valve which can be interposed between a reservoir and a source of supply of air under pressure whereby a predetermined pressure can be established and maintained in said reservoir. For example, when air is pumped into a gasoline reservoir for use in forcing the gasoline out of said reservoir, it is highly desirable to maintain a certain uniformity of pressure in said reservoir and it sometimes happens that the mixture of the gasoline fumes with the air in said reservoir increases the pressure therein beyond the desired pressure, and it is one of the main objects of my invention to provide a valve which will serve to automatically permit air to be pumped through said valve at the pressure for which it is set and which will also automatically permit the escape of air from said valve into the atmosphere when the pressure in the reservoir into which the air is being pumped increases beyond the predetermined degree.

In order to explain my invention, I have shown one practical embodiment thereof on the accompanying sheet of drawings, which I will now describe.

Figure 1 is a perspective view of the invention shown for descriptive purposes, in vertical section; and Figure 2 is a detail.

Referring now in detail to the drawings, the embodiment of the invention here illustrated includes a body 1, having the chamber 2, and the passageway 3. A top member 4 is provided, having the chamber 5, with the extension 6, and the annular recess 7, forming two annular contact rings or ridges, as 8. Said body 1, and said top member 4, are secured together with bolts 9, and a diaphragm 10, is clamped therebetween, said diaphragm being preferably of phosphorus bronze; this diaphragm is provided with a two part valve element 11, consisting of the valve element 11$^a$, and the clamping nut 11$^b$, which clamps said valve to said diaphragm. A spring 12, is seated on the top of said valve element 11, and extends into said extension 6; the spring has a bearing element 13, in its upper end, adapted to be held and adjusted by an adjustment screw 14, with lock nut 15, said spring being for a purpose hereinafter referred to.

Mounted in the chamber 2 of the body 1, is a member 16, having a threaded stem 17, screwed down into the upper end of the passageway 3. Said member 16 has an axial bore 18, terminating in its upper end in a chamber 19, from which run the bores 20, 20, into the chamber 2, as indicated. Moving in said chamber 19, is a spool-like element 21, which is shown in Fig. 2, of square form with rounded corners, whereby to leave the spaces 22, between its sides and the inside of said chamber 19. Said spool-like element 21 also has a bore into its underside, designated 23, in which extends the upper end of a plunger rod 24, secured thereto by a set screw 21$^a$. This rod extends down through the central bore 18, with its lower end secured in another spool-like member 26, by a set screw 26$^a$, said member 26, moving in passageway 3, and at its lower end being seated on a spring 27. This spring is located in a screw plug 28, substantially as shown, which spring normally holds said member 26 seated against the member 17, as shown.

A supply pipe 29, is connected to said body 1, as shown, and communicates through a bore 30, with the passageway 3. An outlet or reservoir pipe 31, is connected with the body 1, and communicates with the chamber 2 through a bore 32.

It will be noted that the valve element 11, secured to the center of the diaphragm 10, seats at its lower side upon the top of the spool-like element 21, and is normally closed by said element 21. The spring 12, normally holds said valve 11 and said diaphragm depressed, and bears on the upper end of spool-like element 21, while the spring 27 normally moves the spool-like element 26 to its upper position, as shown; but when there is no pressure under the diaphragm sufficient to overcome the tension of spring 12, as adjusted, said spring 12 operates to depress said diaphragm valve 11, and said elements 21, 24, and 26, sufficiently to open the lower end of member 17, and puts the axial bore 18 in communication with the passageway 3. Outlet ports 33 are provided through the top member 4 from the chamber 5, for a purpose hereinafter again referred to.

The use and operation of the invention may be briefly described as follows:

Assume that air under pressure, from pump or other source of supply, is being admitted through pipe 29, into passageway 3;

it will pass through the axial bore in member 17, into chamber 2, through the bores 20, 20, from which it passes out through bore 32, to pipe 31, to the place of storage. This will continue until the pressure becomes sufficient to overcome the tension of spring 12, in connection with the action of spring 27, and through the diaphragm to raise valve element 11, at the same time permitting the spring 27 to move the parts 26, 24 and 21 upwardly and closing the axial bore 18, thus closing the inlet for the supply of air from pipe 29. The pressure in chamber 2 is now the same as that in the reservoir to which pipe 31 leads, and is equal to that for which spring 12 is set.

Assuming now for illustrative purposes, that for some reason the pressure in the pipe 31 is increased beyond the desired degree, and there is as a consequence, a back pressure in the chamber 2 is created, with the result that the diaphragm is flexed upwardly sufficiently to lift the valve member 11 from the spool-like element 21. This allows the escape of said pressure into the chamber 5, and out through the ports 33 to the atmosphere, thus automatically regulating the pressure to be developed in the reservoir, or other storage, through pipe 31.

Thus I have provided a simple, compact, and efficient control or regulating valve mechanism which will function to automatically maintain a certain predetermined pressure in the pipe 31, and the reservoir or storage tank connected therewith, and which will, at the same time permit the regular supply of air under pressure from the supply pipe, 29, through said mechanism, to said pipe 31, as before described.

I am aware that changes in details can be made in the showing illustrating the invention without departing from the spirit thereof, and I do not, therefore, limit the invention to the details and arrangement shown, except as I may be limited by the hereto appended claim.

I claim:

In an automatic valve control, in combination, a body having a chamber therein, with passageway, valve mechanism in said passageway, inlet means for air under pressure to said passageway, outlet means from said chamber, a member in said chamber anchored in said passageway and having an axial bore therethrough and chamber in its upper part, an element moving in said chamber, a plunger rod through said axial bore and connected at its opposite ends with said element and said valve mechanism in said passageway, a spring operating on said valve mechanism in said passageway, a top member clamped on said body, a diaphragm between said body and said top member, a valve element through said diaphragm and seated on said first mentioned element at the upper end of said plunger rod, a spring bearing on said valve element whereby to tension the movement of said diaphragm in one direction, means for regulating the tension of said spring, and means forming outlet to the atmosphere through said top member above said diaphragm, said diaphragm and its valve member being adapted to be moved by excessive pressure on said diaphragm, whereby to move its valve element off of said element on said plunger rod, substantially as and for the purpose indicated.

Signed at Los Angeles, Los Angeles County, California, this 3rd day of October, 1925.

WILFRED FOURNESS.